Jan. 10, 1928.　　　　　　　　　　　　　　　　　1,655,753
G. W. COLE
FEEDER
Filed March 2, 1926　　　　　　　2 Sheets-Sheet 1
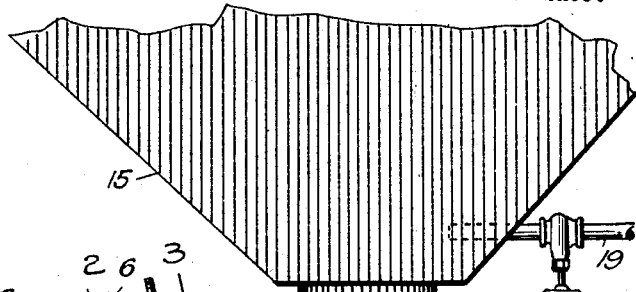
Fig. 1
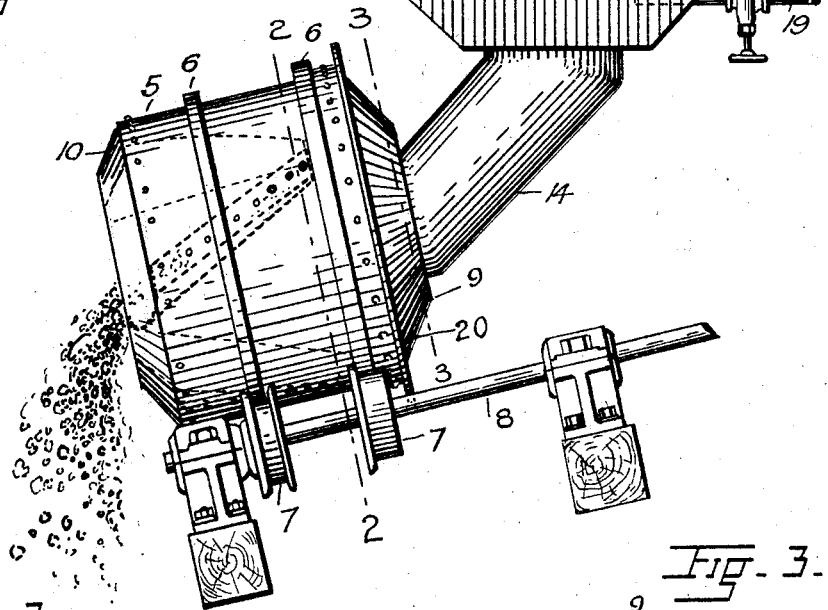
Fig. 2
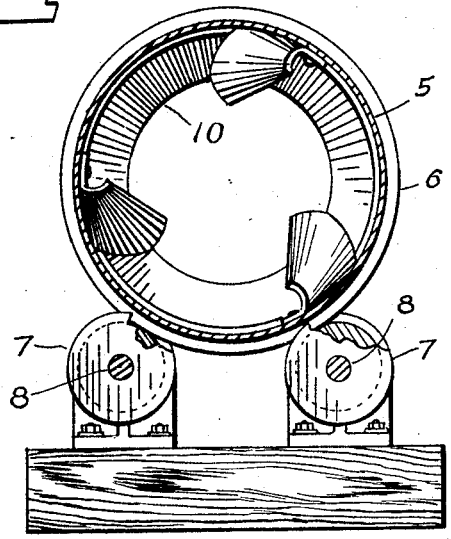
Fig. 3
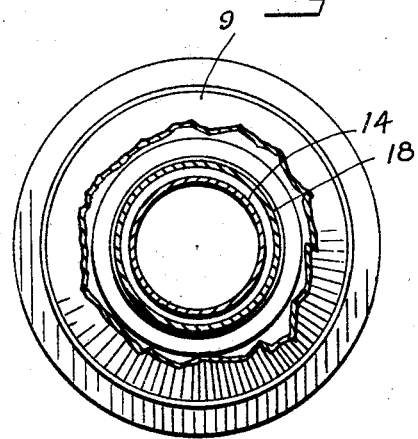
INVENTOR.
G. W. Cole
BY
ATTORNEY.

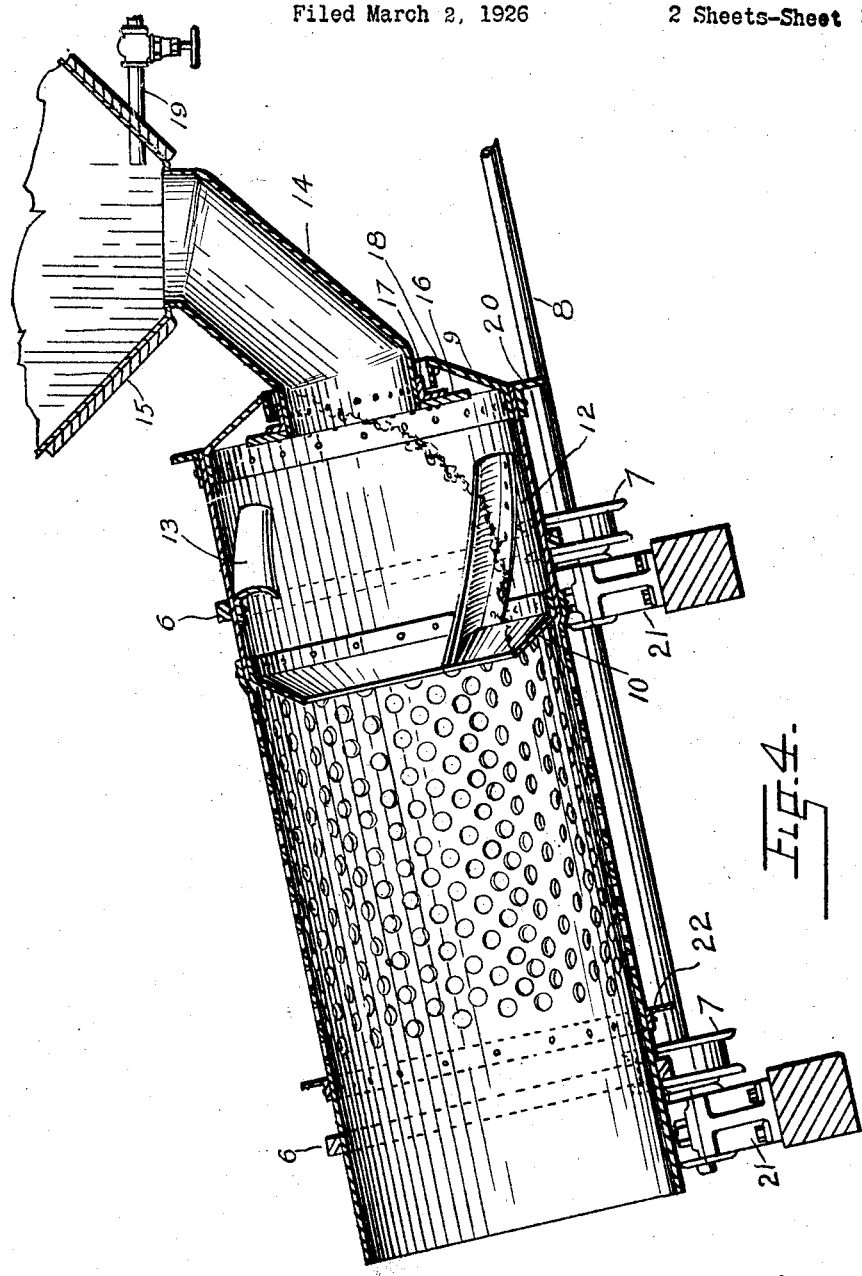

Patented Jan. 10, 1928.

1,655,753

UNITED STATES PATENT OFFICE.

GEORGE W. COLE, OF ADAMS COUNTY, COLORADO.

FEEDER.

Application filed March 2, 1926. Serial No. 91,825.

This invention relates to feeders for sand, gravel and other materials and its principal object is to provide a simple apparatus which by a rotary movement will feed material received from an elevated source of supply, at a uniform rate to a point of discharge.

Another object is to provide a machine of the above described character which feeds automatically at the desired rate, irrespective of variations in the head of the supply.

A further object is to provide a feeder as stated herein above, adapted equally for the conveyance of dry materials as of wet materials, and Still another object of the invention is to provide a feeder which combines simplicity of construction with durability and practicability in use.

With the above and other objects in view, as will fully appear in the course of the following description, my invention resides in the construction, arrangement and combinations of parts illustrated in the accompanying drawings in the several views of which like parts are similarly designated, and in which Figure 1, represents an elevation of the feeder in operative relation to a supply bin;

Figure 2, a section taken on the line 2—2, Figure 1;

Figure 3, a fragmentary section along the line 3—3, Figure 1, looking in the direction of the arrow drawn across the line; and Figure 4, a section of the feeder in the vertical plane of its axis, in connection with a sorting-screen into which the material displaced in the operation of the feeder is discharged.

While the machine as shown and hereinafter to be described may be used for the conveyance of different materials, it is particularly adapted for feeding sand and gravel for use in structural work, and in this connection it functions not only to automatically feed the material received from a source of supply, at a uniform rate, but also to wash and scrub the sand and gravel, and, in connection with a sorting screen, to subsequently scalp the same.

Referring further to the drawings, the feeder comprises a drum 5, mounted to rotate about an inclined axis, the drum being to this end provided with circumferential rails 6, bearing on flanged rollers 7, by which the drum is supported.

The rollers are mounted on parallel shafts 8, one of which is connected with a motor or other source of mechanical energy.

When the feeder is used by itself as in the form illustrated in Figure 1, two sets of rollers may be employed to support the drum at different points, or if the feeder is connected with a screen, as in the construction illustrated in Figure 4, the rollers may be further separated to support the rotating element adjacent the opposite ends thereof.

The drum has at its open ends, outwardly projecting and inwardly slanting circumferential flanges 9 and 10, which coordinate to form in the bottom portion of the drum, a sump 12, in which in the operation of the apparatus, the material collects and from which it is dipped by delivery scoops 13, mounted upon the interior surface of the drum.

These scoops which are trough-shaped and of slightly curved section, extend slantingly from the feed end of the drum downwardly to the delivery end of the same.

The upper ends of the scoops are spaced from the flange at the feed-end of the drum to provide a free passage for the material into the sump provided by the flanges 9 and 10, as stated hereinbefore, and the opposite ends of the scoops extend into the flange 10, at the discharge end of the drum to deliver the material free therefrom as indicated in Figure 1 of the drawings.

Extending into the central opening of the annular flange 9 at the upper end of the drum is the end of an upwardly slanting pipe 14 connecting with the discharge opening of a supply bin 15.

A flat ring 16 is bolted to a collar of angular form at the end of the pipe within the flange to prevent material from spilling through the opening of the flange which is spaced from the pipe to permit of the free and unobstructed rotary movement of the drum with relation thereto.

The ring 16 thus secured to the pipe, is readily removed and replaced in case of wear.

The edge of the flange 10 at the feed end of the drum is turned inwardly as at 18, to restrain the material in the dump and prevent it from spilling through the space between the flange and the relatively stationary pipe.

A valve-controlled conduit 19 extends into the lower portion of the supply bin to supply water to the material if so desired, and a shield 20 formed by a ring of angle-section at the feed end of the drum, serves to prevent the water and fine material from splashing the rollers and the bearings 21 in which they are supported.

In Figure 4 of the drawings, the feeder constructed and disposed as hereinbefore described is at its delivery end connected with a cylindrical screen fastened in axial alinement therewith to receive the material discharged by the scoops 13 and sort it into sizes.

The feeder and screen connected in end-to-end continuity, form one rotary element supported on the rollers 7 which as stated hereinbefore are further separated to evenly sustain the weight of the element and the material passing through the same. A shield 22 similar to the shield 20 mentioned hereinbefore may be provided to protect the rollers and the bearings below the screen.

In the operation of the invention the bin 15 is filled with sand and gravel, or other material, which by its weight passes through the slanting pipe 14 into the rotating drum.

The material collecting in the sump 12 in the lower portion of the drum, defined by the flanges 9 and 10, regulates the discharge from the pipe 14 and is replenished at regular intervals as the scoops 13 moving through the sump, remove quantities of the material according to their capacities.

The spirally disposed scoops lift the material until they reach the slanting position indicated in heavy broken lines in Figure 1, when the material is by gravity discharged through and beyond the central opening of the outwardly projecting flange 10.

The rotary movement of the drum and the passage of the scoops through the relatively stationary material in the sump furthermore produces a scouring action which by water supplied through the pipe 19 cleans the stones and gravel of adhering sand.

The space between the feed end of the drum and the corresponding extremities of the scoops provides a free passages for material from the feed pipe 17 to the sump 12 of the drum and the members 16 and 18 cooperate to prevent spilling of the material through the central opening of the flange 10.

When a screen is used in connection with the feeder as shown in Figure 4, the material delivered by the scoops is sorted into sizes, the undersize falling through the foraminations of the screen while the oversize passes through the open end of the same.

Having thus described my invention, what I claim and desire to secure by Letters Patent is:

1. Feeding apparatus of the character described comprising a rotary open-ended drum, inwardly slanting circumferential flanges at the ends thereof defining a sump, a supply conduit extending into the opening of the flange at the feed-end of the drum, and trough-shaped scoops on the inner surface of the drum, slanting from points of beginning at a distance from the flange at the feed-end of the drum, to the delivery end of the same, to extend downwardly to the feed-end, on the rising side of the drum in its rotary movement in a given direction, the space between the feed end of the drum and the scoops being open to receive the feed before entering the scoops.

2. Feeding apparatus of the character described, comprising a rotary open-ended drum, inwardly slanting circumferential flanges at the ends thereof, the flange at the feed-end of the drum having a relatively fixed inturned rim, scoops on the inner surface of the drum slanting from the feed-end of the drum, to the delivery end of the same, and a supply-conduit extending through the opening of the flange at the feed-end of the drum in spaced relation to the inturned rim thereof, the inturned rim providing a protective mantle for the supply conduit against the abrasive influence of material under treatment.

3. A feeding apparatus of the character described comprising a rotary, open-ended drum having annular flanges at the ends thereof, the flange at the feed end of the drum having an inturned rim providing a recess at the end of the drum, scoops on the inner surface of the drum, a supply pipe extending through the opening of the rim and spaced therefrom, and a ring at the end of the supply pipe partially covering the recess thereby hindering gravel in the drum from passing through the recess and entering the space between the pipe and the rim.

In testimony whereof, I have hereunto affixed my signature.

GEORGE W. COLE.